United States Patent
Sasse et al.

(10) Patent No.: US 9,726,042 B2
(45) Date of Patent: Aug. 8, 2017

(54) GAS TURBINE DUCT CASING

(71) Applicant: MTU Aero Engines AG, Munich (DE)

(72) Inventors: Stefan Sasse, Petershausen (DE); Martin Metscher, Munich (DE); Jan Haegert, Gilching (DE)

(73) Assignee: MTU Aero Engines AG, Munich (DE)

( * ) Notice: Subject to any disclaimer, the term of this patent is extended or adjusted under 35 U.S.C. 154(b) by 224 days.

(21) Appl. No.: 14/638,775

(22) Filed: Mar. 4, 2015

(65) Prior Publication Data
US 2015/0252691 A1    Sep. 10, 2015

(30) Foreign Application Priority Data

Mar. 5, 2014 (DE) .......... 10 2014 203 937
May 28, 2014 (DE) .......... 10 2014 210 182

(51) Int. Cl.
*F01D 25/24* (2006.01)
*F01D 9/06* (2006.01)
*F01D 25/16* (2006.01)
*F02C 7/20* (2006.01)

(52) U.S. Cl.
CPC .......... *F01D 25/243* (2013.01); *F01D 9/065* (2013.01); *F01D 25/162* (2013.01); *F02C 7/20* (2013.01); *F05D 2230/60* (2013.01); *F05D 2230/70* (2013.01); *F05D 2240/14* (2013.01); *F05D 2260/30* (2013.01); *F05D 2260/36* (2013.01);
(Continued)

(58) Field of Classification Search
CPC ........ F01D 25/243; F01D 25/162; F02C 7/20; F05D 2240/14; F05D 2260/30; F05D 2260/36; F05D 2260/37; F16B 35/005; F16B 23/0092

USPC .................................................. 60/796, 797
See application file for complete search history.

(56) References Cited

U.S. PATENT DOCUMENTS

| 623,124 | A | * | 4/1899 | Bailey | F16B 35/005 411/168 |
|---|---|---|---|---|---|
| 2,175,453 | A | * | 10/1939 | Barcy | E04B 1/2612 238/338 |
| 5,451,116 | A | | 9/1995 | Czachor et al. | |

(Continued)

FOREIGN PATENT DOCUMENTS

DE    60 2005 003 051 T2    8/2008
EP       1 598 566 A1      11/2005

OTHER PUBLICATIONS

German Office Action dated Oct. 24, 2014 (Eight (8) pages).
(Continued)

*Primary Examiner* — Steven Sutherland
(74) *Attorney, Agent, or Firm* — Crowell & Moring LLP

(57) ABSTRACT

A gas turbine duct casing, in particular for an aircraft engine, is disclosed. The duct casing has a first wall segment and a second wall segment which is connected to the first wall segment by a clamp arrangement. The clamp arrangement has at least one clamp and one bolt which passes through a hole in the clamp and is screwed to a nut on a side of the clamp facing away from the wall segments. The nut braces at least one first leg of the clamp against the first wall segment, in particular by an intermediate element, and braces at least one second leg of the clamp against the second wall segment. The bolt has a head which is guided in a form-fitting manner in a groove on the outside of the first wall segment facing away from the gas duct.

12 Claims, 2 Drawing Sheets

(52) U.S. Cl.
CPC ..... *F05D 2260/37* (2013.01); *Y10T 29/49229* (2015.01)

(56) References Cited

U.S. PATENT DOCUMENTS

| | | |
|---|---|---|
| 7,261,489 B2 | 8/2007 | Arbona et al. |
| 2012/0257958 A1* | 10/2012 | Norton .................. F01D 5/025 415/108 |

OTHER PUBLICATIONS

European Office Action issued in European counterpart application No. 15 153 419.5-1607 dated Dec. 15, 2016 (Five (5) pages).

* cited by examiner

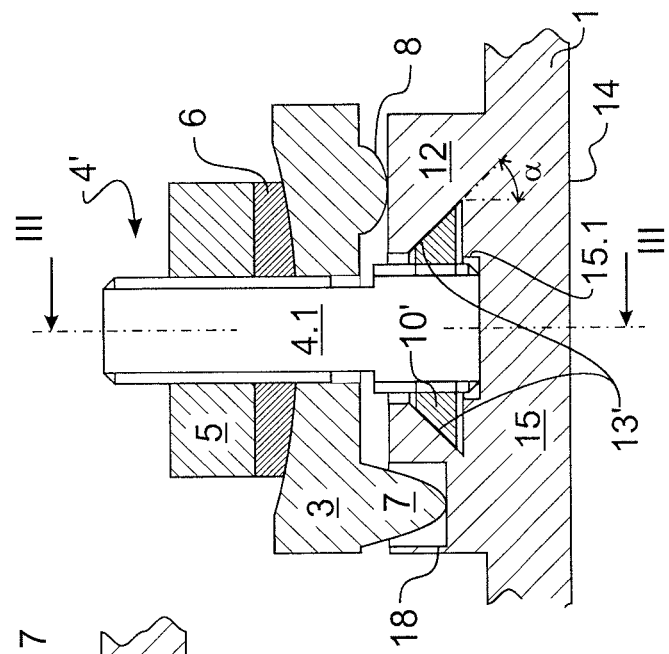
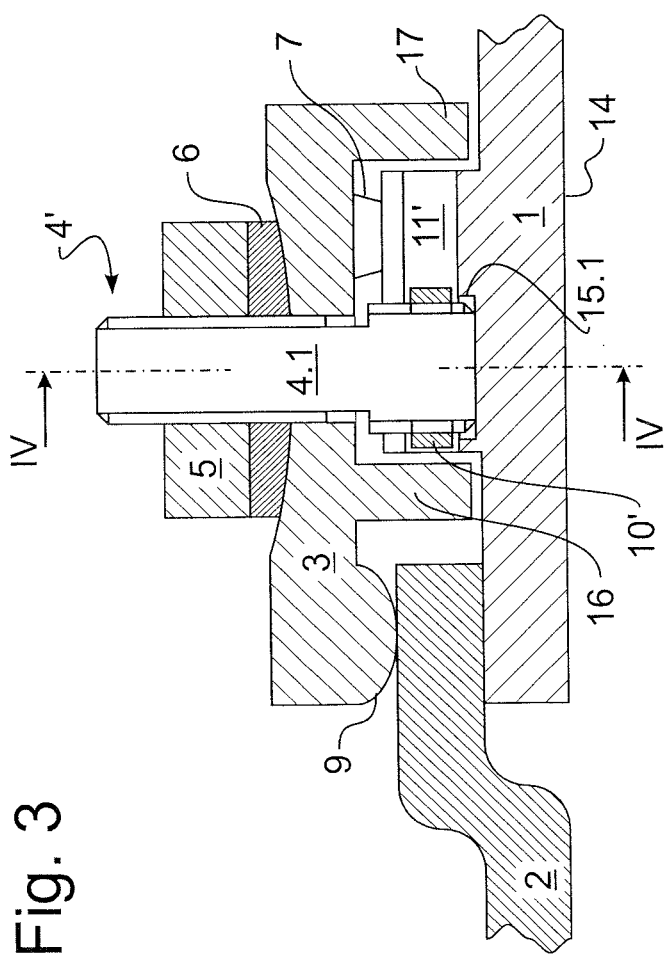

GAS TURBINE DUCT CASING

This application claims the priority of German Patent Application No. DE 10 2014 210 182.4, filed May 28, 2014, and German Patent Application No. DE 10 2014 203 937.1, filed Mar. 5, 2014, the disclosures of which are expressly incorporated by reference herein.

BACKGROUND AND SUMMARY OF THE INVENTION

The present invention relates to a gas turbine duct casing, a gas turbine, in particular an aircraft engine having such a gas turbine duct casing, and a method for (dis)assembly of such a gas turbine duct casing.

U.S. Pat. No. 5,451,116 A, to which reference is additionally made and the content of which is explicitly incorporated by reference herein such that it is also made the subject matter of this patent application, relates to a gas turbine duct casing, wherein bolts are inserted through holes from the inside of the duct and their heads are each soldered to the inside of the duct.

An object of an embodiment of the present invention is to improve upon a gas turbine having a gas turbine duct casing and/or its (dis)assembly.

According to one aspect of the present invention, a gas turbine duct casing of a gas turbine, in particular an aircraft engine and/or for a gas turbine, in particular an aircraft engine, has one or more first wall segments, with which and/or to which a second wall segment adjacent to it in the circumferential direction is connected on one or both sides, in particular being detachably connected. A second wall segment may in turn be connected to first wall segments adjacent thereto on both sides in the circumferential direction. First and second wall segments may be connected to one another in alternation in particular.

In one embodiment, the first wall segment partially overlaps the second wall segment(s) adjacent thereto in the circumferential direction in the circumferential direction. Conversely, in another embodiment, the second wall segment partially overlaps the first wall segment(s) adjacent thereto in the circumferential direction.

In one embodiment, the first or second wall segment has a band on the inside and/or outside radially; this band has the outside and a gas duct inside wall opposite the outside and has a radial strut, which is arranged in the gas duct inside wall and in a refinement extends from the radially inner gas duct inside wall of the radially inner band to the radially outer gas duct inside wall of the radially outer band. Such a wall segment is also referred to as a so-called fairing.

In one embodiment, the other adjacent wall segment in the circumferential direction is a radially inner or radially outer panel, which is connected to the radially inner or outer band of this wall segment. Accordingly, in one embodiment, the first wall segment is a fairing and the second wall segment is a panel. Conversely, in another embodiment, the first wall segment is a panel and the segment wall segment is a fairing.

In one embodiment, the gas turbine duct casing is connected to a turbine of the gas turbine upstream and/or downstream in the direction of flow and/or is adjacent to the turbine in the direction of flow. In one refinement, the gas turbine duct casing is a so-called "turbine center frame" (TCF), which is arranged between a turbine that is upstream in the direction of flow, in particular a high-pressure turbine, and a turbine that is downstream in the direction of flow, in particular a low-pressure turbine.

In one embodiment, at least one first wall segment and one second wall segment adjacent to the former in the circumferential direction or, in one embodiment, a plurality of wall segments, in particular all the first wall segments and second wall segments that are adjacent to the former in the circumferential direction are connected in a friction-locking or form-fitting manner by a clamp arrangement.

The clamp arrangement has one or more clamps spaced a distance apart from one another, in particular in the axial direction of the turbine, each having a bore and a bolt extending through these holes and on a side facing away from the wall segment, the clamps are bolted using a nut, which clamps one or more first legs of the clamp against the first wall segment and one or more second legs of the clamp against the second wall segment, in particular directly or by way of an intermediate element.

The clamp may be in particular a three-legged clamp having a first leg, which is supported on the first wall segment, and two second legs, which are supported on the second wall segment or having two first legs, which are supported on the first wall segment, and one second leg, which is supported on the second wall segment. In one embodiment, the intermediate element and the clamp each have complementary spherical contact surfaces.

The clamp (arrangement) in one embodiment connects the first and second wall segments in a friction-locking manner in that it is supported against the tension by the nut, on the one hand, on the one wall segment of the first and second wall segments, and, on the other hand, on the other one of the first and second wall segments partially overlapping the former, and thus the two wall segments are braced radially against one another. Additionally or alternatively, the clamp (arrangement) may connect the first and second wall segments in a form-fitting manner, in particular securing them by at least one first and/or at least one second leg engaging in a recess, in particular in a blind hole in the first wall segment and/or in a recess, in particular a blind hole in the second wall segment.

According to one aspect of the present invention, the bolt has a head which is guided in a form-fitting manner in a groove on the outside of the first wall segment facing away from the duct. In one embodiment, the groove has one or two opposing undercuts in the radial direction, securing the head of the bolt guided therein in a form-fitting manner in the radial direction. In one embodiment, it extends at least essentially in the axial or circumferential direction of the turbine.

In one embodiment, the assembly and/or disassembly can be improved in this way, in contrast with a bolt, which is inserted through the inside wall of the gas duct from the inside of the duct and is soldered to it. This is accomplished by inserting the bolt (head) into the groove from the outside and/or removing it therefrom.

In one embodiment the groove is closed at least essentially with respect to a gas duct inside wall of the first wall segment opposite the outside. In one embodiment, in contrast with a bolt, which is inserted through the gas duct inside wall from the inside of the duct, the gas duct inside wall is improved technically with regard to the flow, sealing, heat and/or processing in this way. In one embodiment, the head, which is guided in the groove that is separated from the gas duct inside wall by a wall at the base of the groove, is not exposed to oncoming flow from a working fluid of the gas turbine and is therefore subject to less thermal stress. Additionally or alternatively in one embodiment, this head does not interfere with the flow of working fluid in the gas duct. Additionally or alternatively in one embodiment, it is easier to work on the gas duct inside wall, which is closed at least essentially in the region of the groove. Additionally or alternatively in one embodiment, it is not necessary to seal a hole through which a bolt passes in the gas duct inside wall.

In one embodiment the bolt is releasably guided in the groove, in particular without any physical bonding in the groove. In one embodiment, in contrast to a bolt, which is soldered to the gas duct inside wall, the assembly and/or disassembly is/are improved in this way.

In one embodiment, the groove is closed on an end face and is open on the opposite end face. In one embodiment, the head can be inserted into the groove from the open end face in this way and is secured and/or retained in a form-fitting manner in the direction of extent of the groove by the opposite closed end face. In one embodiment, the groove is open on both end faces. In one embodiment, the head may be inserted into the groove from either open end faces and/or removed therefrom in this way.

In one embodiment, the clamp has at least one stop which overlaps the groove, in particular with clearance or at least essentially without a clearance. The clamp can be secured against a corresponding displacement in this way. In one refinement, the clamp has a first stop and a second stop, which overlap the groove on opposite sides, in particular on end faces in the direction of extent of the groove or longitudinal sides parallel to the direction of extent of the groove and thus secure a corresponding displacement in both directions.

In one embodiment, one or more first legs of the clamp engage in a recess, in particular a blind hole, which is situated in the first wall segment beside the groove. In one embodiment, the clamp can be secured in a form-fitting manner in this way, with play in the direction of extent of the groove.

In one embodiment, the groove is arranged in a protruding radial projection on the outside of the first wall segment. In this way, in one embodiment, the production of the groove and/or the insertion and/or removal of the head can be facilitated.

For assembly of the gas turbine duct casing, in one embodiment, the head of the bolt is inserted into the groove on the outside of the first wall segment and the nut together with the bolt is screwed in. Before, during or after the insertion, in one embodiment the first and second wall segments are made to overlap and the clamp is attached to the bolt.

In one embodiment, for dismantling the gas turbine duct casing, the nut is removed from the bolt, in particular being unscrewed or separated, and the head of the bolt is removed from the groove, in particular being pushed off or removed.

In one embodiment, the head of the bolt is connected to the remaining bolt by a physically bonded connection, in particular being integrally designed.

In another embodiment, the bolt is designed in multiple parts and has a threaded pin with a first and a second outside thread as well as a head designed separately from the former and having the inside thread, which is screwed onto the first outside thread of the threaded shaft, in particular directly or by way of a threaded sleeve. The second thread is and/or will be screwed with the nut. It may have a smaller diameter than the first thread, in particular in order to reduce the diameter of the hole of the clamp. The first thread of the threaded pin, which has been screwed to the head of the bolt may, likewise, have a smaller diameter than the second thread, in particular in order to advantageously reduce the diameter of the inside thread of the head. In another embodiment, the first and second threads of the threaded pin have the same diameter and in particular may be formed by two sections of a continuous thread on the threaded pin.

The first and second threads of the threaded pin are preferably oriented in the same direction, i.e., both clockwise and/or counterclockwise. It is possible in this way to prevent the screw connection of the first thread with the head of the bolt from being released simultaneously when tightening the nut, which is engaged with the second thread.

In one embodiment, the head, which is formed separately, may be stressed by screwing it to the threaded pin in the groove, in particular against the undercut(s) thereof. Accordingly, in one embodiment, the threaded pin of the multipart bolt is screwed to the head of the bolt guided in the groove in order to brace the head in the groove and thus secure it in a friction-locking manner. In one embodiment, the bolt may advantageously be secured in the groove in this way, independently of a screw connection to the nut. The threaded pin is therefore preferably supported against and/or on a wall at the base of the groove.

Accordingly in one embodiment, the head, which is formed separately, is inserted into the groove. The threaded pin is then screwed into the head in advance, during or subsequently. Through (further) screwing of the threaded pin to the head, the latter is braced in the groove and/or against the undercut(s) therein and is thereby secured in a friction-locking manner. Next, the nut is screwed with the threaded pin and braces the clamp against the first and second wall segments. To remove such a head of the bolt out of the groove, in one embodiment conversely the screw connection of the threaded pin to the head may be loosened, in particular being released.

In one refinement, the threaded pin is screwed to the head of the bolt, which is guided in the groove, securing it in a twist-proof manner, in particular in a physically bonded manner, preferably by a screw-lock adhesive, or in a form-fitting manner, preferably by notching. The threaded pin and head are preferably twist-lock secured after the head has been braced by screw connection to the threaded pin in the groove, in particular against the undercut(s) thereof. Unintentional release of the screw connection from the head and the threaded pin is prevented in this way. To remove the head from the groove, in one embodiment, the twist-proof lock of the threaded pin to the head may be overcome, in particular by cutting and/or destroying the physical bonding, preferably by applying the correspondingly great torque.

In one embodiment, the bolt, in particular a threaded pin screwed to the head of a multipart bolt, preferably having an end section protruding out of the screwed-on head, engages in a recess in the radial direction in the wall at the base of the groove, preferably being supported therein in the radial direction, with or without play, in and/or across the direction of extent of the groove. In this way, in particular additionally or alternatively to a friction-locking means of securing the head by the screw connection explained above using a separately designed threaded pin, wherein this bolt is and/or will be secured in a lock-proof manner and/or in a form-fitting manner against unintentional removal from the groove.

In one embodiment, the undercut(s) of the groove is/are running at least essentially perpendicular to the radial direction. In another embodiment, the undercut(s) of the groove is/are inclined obliquely and/or toward the radial direction and/or converge toward the nut. The undercut(s) preferably form(s) a wedge angle with the radial direction, amounting to at least 15° and/or at most 75° in one embodiment. In particular for undercutting such inclined undercuts, in one embodiment, the head of the bolt, which is designed to be separate or integral, may be designed in the form of a wedge. Accordingly in one embodiment the head and groove are designed to dovetail together and/or have congruent oblique contact faces inclined toward the radial direction. In this way, in one embodiment, a wedge effect can advantageously be achieved in screw connection of the bolt to the nut and/or a threaded pin to a head of the bolt.

Additional advantageous refinements of the present invention are derived from the dependent claims and the following description of preferred embodiments.

BRIEF DESCRIPTION OF THE DRAWINGS

FIG. 3 shows a part of a gas turbine duct casing of an aircraft engine according to another embodiment of the present invention in a section along line III-III in FIG. 4; and FIG. 4 shows a part of the gas turbine duct casing of FIG. 3 in a section along line IV-IV in FIG. 3.

DETAILED DESCRIPTION OF THE DRAWINGS

Figure 1:
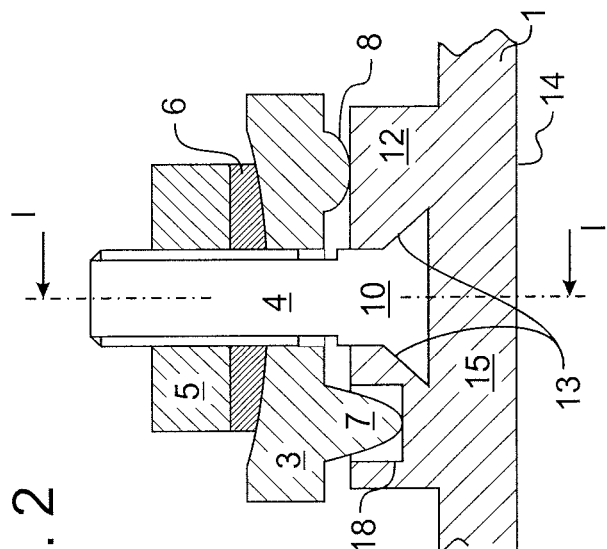
FIG. 1 shows a part of a gas turbine duct casing of an aircraft engine according to one embodiment of the present invention in a section along line I-I in FIG. 2.
Figure 2:
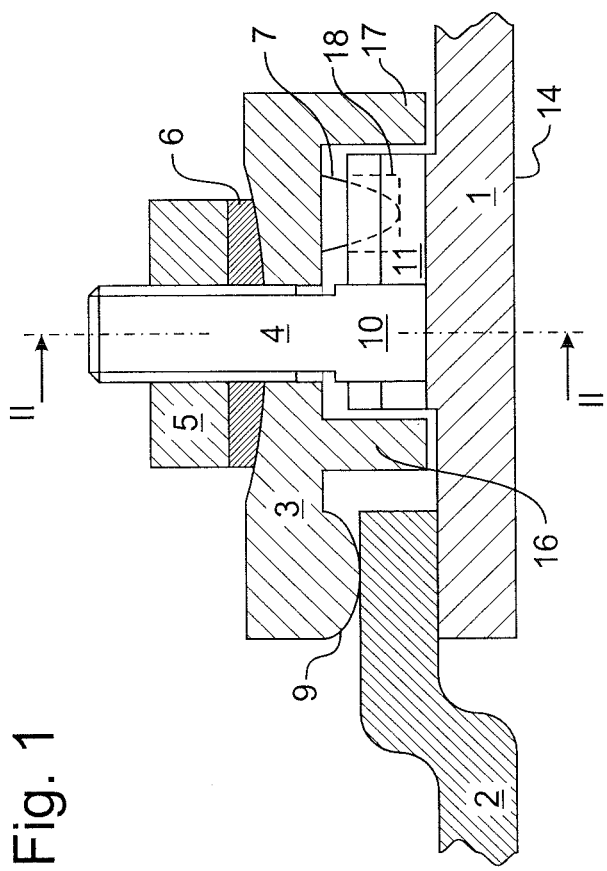
FIG. 2 shows a part of the gas turbine duct casing of FIG. 1 in a section along line II-II in FIG. 1.

FIGS. 1 and 2 show mutually perpendicular sections as seen in the axial direction, i.e., the flow-through direction (FIG. 1) and/or perpendicular thereto (FIG. 2), part of a gas turbine duct casing of an aircraft engine according to one embodiment of the present invention in the form of a TCF.

The gas turbine duct casing has several first wall segments in the form of so-called fairings 1, one of which is partially shown in FIGS. 1, 2, and alternating therewith radially (vertically in FIGS. 1, 2) inner or outer panels 2 in the circumferential direction (perpendicular to the plane of the drawing in FIG. 2), one panel of which is shown partially in FIG. 1. The panels 2 partially overlap the fairings 1 in the circumferential direction, as can be seen in FIG. 1, and each is connected thereto by a clamp arrangement.

The clamp arrangement has three-legged clamps 3 spaced a distance apart from one another in the axial direction of the turbine, one of which clamps is shown in FIGS. 1, 2. It has a hole through which a bolt 4 passes, and the bolt is and/or will be screwed onto an end of the clamp (top in FIG. 1, 2) with a nut 5 on an end facing away from the wall segment. The nut spans two first legs 7, 8 of the three-legged clamp against the fairing and a second leg 9 of the clamp against the panel by means of an intermediate element 6.

The bolt has a head 10, which is guided in a form-fitting manner on the outside, facing away from the duct (at the top in FIGS. 1, 2), of the fairing, without being physically bonded in a groove 11. The groove is arranged in a protruding radial protrusion 12 on the outside of the fairing and has two opposing undercuts 13 in the radial direction, which secure the head of the bolt guided therein in a form-fitting manner in the radial direction (vertically in FIGS. 1, 2). The groove extends essentially in the axial direction of the turbine (horizontally in FIG. 1).

The groove is closed by an intermediate wall 15 against a gas duct inside wall 14 of the fairing, which is opposite the outside, and the groove is open on both end faces in the direction of extent of the groove (horizontally in FIG. 1).

The clamp has a first stop 16 and a second stop 17, which extend beyond the groove on opposite end faces in the direction of extent of the groove (at the left, right in FIG. 1) and are thus secured against a corresponding displacement of the head in the groove.

The one first leg 7 of the clamp engages in a blind hole 18 which is arranged next to the groove in the fairing.

For assembly of the gas turbine duct casing, the head 10 of the bolt 4 is inserted into the groove 11 on the outside of the fairing 1 and the nut 5 is screwed onto the bolt. Before, during or after this insertion, the fairing and the panel are made to overlap and the clamp 3 is placed on the bolt.

Conversely, for disassembly of the gas turbine duct casing, the nut 5 is removed from the bolt 4 and the head 10 of the bolt is removed from the groove 11.

FIGS. 3, 4 show a portion of the gas turbine duct casing of an aircraft engine according to another embodiment of the present invention, shown in a manner similar to that in FIGS. 1, 2. Corresponding features are labeled with identical reference numerals, differentiated by an apostrophe ('), if necessary, so that reference is made to the preceding description and only differences will be discussed in the following description.

In the embodiment according to FIGS. 1, 2, the head 10 of the bolt 4 is designed integrally with the remaining bolt. In the embodiment according to FIGS. 3, 4, however, the bolt 4' is designed in multiple parts and has a threaded pin 4.1 with a first outside thread (at the bottom in FIGS. 3, 4) and a second outside thread (at the top in FIG. 2) as well as a separately designed head 10' with the inside thread which is and/or will be screwed together with the first outside thread of the threaded pin. The second thread is and/or will be screwed with the nut 5 in the manner described above. It has a smaller diameter than the first thread.

In the embodiment according to FIGS. 3, 4, the head 10' and groove 11' are designed to dovetail. To do so the undercuts 13' of the groove 11' are inclined obliquely and/or toward the radial direction (vertically in FIGS. 3, 4) and converging toward the nut 5 while the separately designed head 10' of the bolt 4' is designed in a wedge shape accordingly. In one modification, the undercuts 13 in the embodiment according to FIGS. 1, 2 may be designed in this way. The undercuts 13' form a wedge angle $\alpha$ with the radial direction, this angle amounting to 45° in the embodiment according to FIGS. 3, 4.

For assembly of the gas turbine duct casing of the embodiment according to FIGS. 3, 4, the separately designed head 10' is inserted into the groove 11'. Before, during or afterward, the threaded pin 4.1 is screwed into the head. By further screwing of the threaded pin to the head, the latter is braced in the groove 11' and/or against its undercuts 13'. Next, the threaded pin 4.1 is secured against twisting by means of a screw-locking adhesive in a physically bonded manner with the head 10' of the bolt 4' guided in the groove 11'.

Next, in the manner described above, the nut 5 is screwed to the bolt 4.1. Before, during or after the insertion and bracing of the head 10' into and/or in the groove 11', the fairing 1 and the panel 2 are made to overlap while the clamp 3 is attached to the bolt 4.1 and the nut 5 is screwed to the threaded pin 4.1.

In the embodiment according to FIGS. 3, 4, the threaded pin 4.1 screwed to the head 10' and having an end section (at the bottom in FIGS. 3, 4) protruding out of the screwed on head engages with a play in a recess 15.1 in the intermediate wall and/or groove base wall 15 which extends in the radial direction and is supported in this in the radial direction. Therefore, in addition to the friction-locking means of securing the head 10' through the screw connection to the threaded pin 4.1 explained above, the bolt 4' engaging in the recess 15.1 can be secured in a lock-proof manner in a form-fitting manner. This shows that even without the bracing of the head 10' in the groove 11', the multipart bolt 4' can be secured in a loss-proof manner if the end section of the threaded pin 4.1 engages in and/or is or will be screwed into the recess 15.1 so far that the head 10' prevents the threaded pin 4.1 from being extracted by form-fitting contact with the undercuts 13'. In the exemplary embodiment described here, however, the threaded pin 4.1 is supported in the recess 15.1 in the radial direction and thus braces the head 10' screwed to it against the undercuts 13' and thus in the groove 11' and secures it in a friction-locking manner in this way. Conversely, in a modification (not shown) of the threaded pin, the threaded pin could brace the head in the groove without engaging in a recess in the wall at the base of the groove and thereby securing the bolt additionally in a loss-proof and form-fitting manner.

Although exemplary embodiments have been described in the preceding description, it should be pointed out that a variety of modifications are possible. Furthermore, it should be pointed out that the exemplary embodiments are just examples, which should in no way restrict the scope of protection, the applications or the design. Instead, the preceding description provides those skilled in the art with a guideline for implementation of at least one exemplary embodiment, wherein various changes can be made, in particular with regard to the function and arrangement of the components described, without going beyond the scope of protection as derived from the claims and combinations of features equivalent thereto.

LIST OF REFERENCE NUMERALS

1 fairing (first wall segment)
2 panel (second wall segment)
3 clamp
4; 4' bolt
4.1 threaded pin
5 nut
6 intermediate element
7, 8 first leg
9 second leg
10; 10' head
11; 11' groove
12 radial protrusion
13; 13' undercut
14 gas duct inside wall
15 intermediate wall, wall of base of groove
15.1 recess
16, 17 stop
18 blind hole (recess)

What is claimed is:

1. A gas turbine duct casing, comprising:
   a first wall segment;
   a second wall segment; and
   a clamp arrangement, wherein the first wall segment is connectable to the second wall segment by the clamp arrangement;
   wherein the clamp arrangement has a clamp and a bolt which is passable through a hole defined by the clamp and is screwable to a nut on a side of the clamp facing away from the first and second wall segments;
   wherein a first leg of the clamp is braceable against the first wall segment by the nut and a second leg of the clamp is braceable against the second wall segment by the nut;
   wherein the bolt has a head which is guidable in a form-fitting manner in a groove on an outside of the first wall segment facing away from a gas duct;
   and wherein the clamp has a first stop and a second stop which extend around the groove on opposing sides.

2. The gas turbine duct casing according claim 1, wherein the groove is closed with respect to a gas duct inside wall of the first wall segment which is opposite the outside.

3. The gas turbine duct casing according claim 1, wherein the bolt is releasably guided in the groove.

4. The gas turbine duct casing according to claim 1, wherein the bolt has a threaded pin which is screw-connectable to the head of the bolt.

5. The gas turbine duct casing according to claim 1, wherein the bolt engages in a form-fitting manner in a recess in a wall of a base of the groove.

6. The gas turbine duct casing according to claim 1, wherein the groove has an undercut and wherein the head of the bolt is securable by the undercut in a radial direction.

7. The gas turbine duct casing according to claim 1, wherein the groove is closed on an end face or is open on two end faces.

8. The gas turbine duct casing according to claim 1, wherein the first leg of the clamp is engageable in a recess in the first wall segment next to the groove.

9. The gas turbine duct casing according to claim 1, wherein the groove extends in an axial or a circumferential direction.

10. The gas turbine duct casing according to claim 1, wherein the groove is arranged in a protruding radial protrusion of the outside of the first wall segment.

11. A method for assembly of a gas turbine duct casing according to claim 1, comprising the steps of:
    inserting the head of the bolt into the groove of the first wall segment;
    overlapping the second wall segment on the first wall segment;
    placing the clamp on the bolt and engaging the clamp with the first and the second wall segments; and
    screwing the nut on the bolt.

12. A method for disassembly of a gas turbine duct casing according to claim 1, comprising the steps of:
    unscrewing the nut from the bolt;
    removing the clamp from the bolt and disengaging the clamp from the first and the second wall segments; and
    removing the head of the bolt from the groove of the first wall segment.

* * * * *